US012642723B2

(12) United States Patent
Harada et al.

(10) Patent No.: US 12,642,723 B2
(45) Date of Patent: Jun. 2, 2026

(54) BED SYSTEM

(71) Applicant: Paramount Bed Co., Ltd., Tokyo (JP)

(72) Inventors: Masakazu Harada, Tokyo (JP); Wataru Kasai, Tokyo (JP); Kunitika Sasaki, Tokyo (JP)

(73) Assignee: Paramount Bed Co., Ltd., Tokyo (JP)

( * ) Notice: Subject to any disclaimer, the term of this patent is extended or adjusted under 35 U.S.C. 154(b) by 385 days.

(21) Appl. No.: 18/347,981

(22) Filed: Jul. 6, 2023

(65) Prior Publication Data

US 2024/0307242 A1 Sep. 19, 2024

(30) Foreign Application Priority Data

Mar. 13, 2023 (JP) ................................ 2023-038766

(51) Int. Cl.
*A61G 7/05* (2006.01)
*A61G 7/018* (2006.01)

(52) U.S. Cl.
CPC ........... *A61G 7/0516* (2016.11); *A61G 7/018* (2013.01)

(58) Field of Classification Search
CPC ............................. A61G 7/018; A61G 7/0516
See application file for complete search history.

(56) References Cited

U.S. PATENT DOCUMENTS

| | | | | |
|---|---|---|---|---|
| 2007/0132597 | A1* | 6/2007 | Rodgers | G06Q 10/10 348/E7.078 |
| 2008/0005836 | A1 | 1/2008 | Kawaguchi et al. | |
| 2015/0281659 | A1* | 10/2015 | Hood | H04N 7/188 348/143 |
| 2017/0143565 | A1* | 5/2017 | Childs | A61G 7/0524 |
| 2017/0156638 | A1* | 6/2017 | Ribble | A61G 7/018 |
| 2020/0060910 | A1* | 2/2020 | Lightcap | H04N 7/188 |
| 2022/0142588 | A1 | 5/2022 | Taketomi et al. | |

FOREIGN PATENT DOCUMENTS

| | | | | |
|---|---|---|---|---|
| IT | 201800010431 A1 * | 5/2020 | | A61G 7/0516 |
| JP | 2006-136633 A | 6/2006 | | |
| JP | 2017012426 A | 1/2017 | | |
| JP | 2022076666 A | 5/2022 | | |

* cited by examiner

*Primary Examiner* — Eric J Kurilla
(74) *Attorney, Agent, or Firm* — Kim & Stewart LLP

(57) ABSTRACT

A bed system includes: a bed main body; a side rail provided on the bed main body; a driving unit configured to drive the side rail; a first detector configured to detect a motion of a user on the bed main body; and a controller configured to control the driving unit based on the motion of the user detected by the first detector.

15 Claims, 12 Drawing Sheets

BED SYSTEM

CROSS-REFERENCE TO RELATED APPLICATIONS

This application is based upon and claims the benefit of priority from the prior Japanese Patent Application No. 2023-038766, filed on Mar. 13, 2023; the entire contents of which are incorporated herein by reference.

FIELD

Embodiments as examples relate to a bed system.

BACKGROUND

A bed including a side rail is known.

There is a bed provided with a side rail so that a user of the bed does not fall off the bed. However, the user may forget to raise the side rail when using the bed. In such a case, the side rail cannot prevent the user from falling off. The side rail may also be a type of being fixed by, for example, a lock mechanism. In a case of such a type, it is difficult to unlock the lock mechanism from the bed.

SUMMARY

According to one embodiment, a bed system includes: a bed main body; a side rail provided on the bed main body; a driving unit configured to drive the side rail; a first detector configured to detect a motion of a user on the bed main body; and a controller configured to control the driving unit based on the motion of the user detected by the first detector.

DETAILED DESCRIPTION

Figure 1:
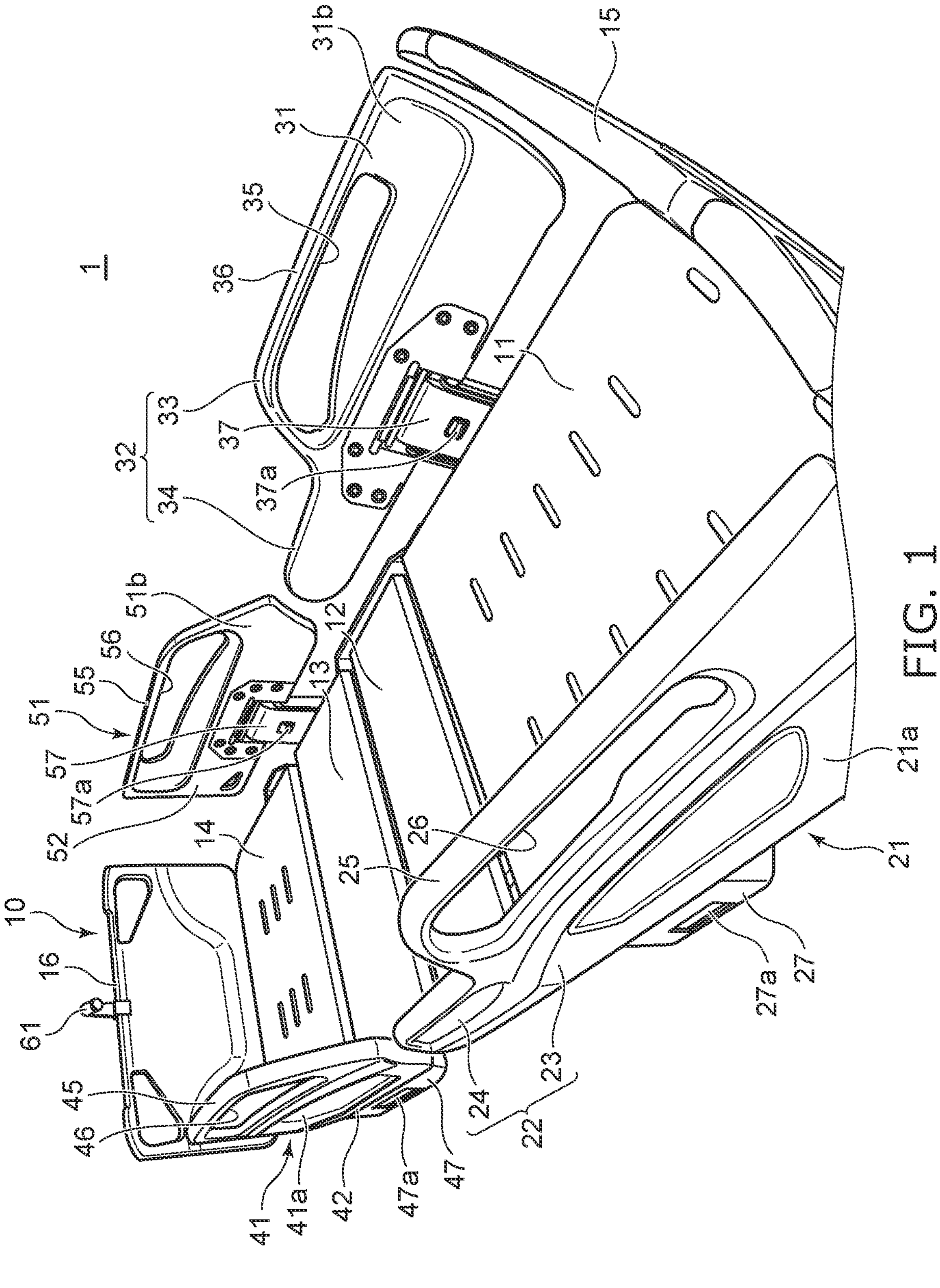
FIG. 1 is a perspective view illustrating an example of a bed system according to a first embodiment.

One or more embodiments are now described with reference to the drawings, wherein like reference numerals are used to refer to like elements throughout. In the following description, for purposes of explanation, numerous specific details are set forth in order to provide a thorough understanding of the various embodiments. It is evident, however, that the various embodiments can be practiced without these specific details (and without applying to any particular networked environment or standard).

As used in this disclosure, in some embodiments, the terms “component,” “system” and the like are intended to refer to, or comprise, a computer-related entity or an entity related to an operational apparatus with one or more specific functionalities, wherein the entity can be either hardware, or a combination of hardware and software in execution.

One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus specific functionality provided by mechanical parts operated by electric or electronic circuitry, which is operated by a software application or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software stored on a non-transitory electronic memory or firmware that confers at least in part the functionality of the electronic components. While various components have been illustrated as separate components, it will be appreciated that multiple components can be implemented as a single component, or a single component can be implemented as multiple components, without departing from example embodiments. Further, the various embodiments can be implemented as a method, apparatus or article of manufacture using standard programming and/or engineering techniques to produce software, firmware, hardware or any combination thereof to control a computer to implement the disclosed subject matter. The term “article of manufacture” as used herein is intended to encompass a computer-readable (or machine-readable) device or computer-readable (or machine-readable) storage/communications media having a computer program stored thereon. For example, computer readable storage media can comprise, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words “example” and “exemplary” are used herein to mean serving as an instance or illustration. Any embodiment or design described herein as “example” or “exemplary” is not necessarily to be construed as preferred or advantageous s over other embodiments or designs. Rather, use of the word example or exemplary is intended to present concepts in a concrete fashion. As used in this application, the term “or” is intended to mean an inclusive “or” rather than an exclusive “or”. That is, unless specified otherwise or clear from context, “X employs A or B” is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Embodiments described herein can be exploited in substantially any wireless communication technology, comprising, but not limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra mobile broadband (UMB), high speed packet access (HSPA), Z-Wave, Zigbee and other 802.XX wireless technologies and/or legacy telecommunication technologies.

In general, one aspect of the present application is a bed system including: a bed main body; a side rail provided on the bed main body; a driving unit configured to drive the side rail; a first detector configured to detect a motion of a user on the bed main body; and a controller configured to control the driving unit based on the motion of the user detected by the first detector.

Another aspect of the present application is a bed system including: a bed main body; a side rail provided on the bed main body; a driving unit configured to drive the side rail; a second detector configured to detect a motion of a caregiver outside the bed main body; and a controller configured to control the driving unit based on the motion of the caregiver detected by the second detector.

Further another of aspect the present application is a bed system including: a bed main body; a side rail provided on the bed main body; a driving unit configured to drive the side rail; a first detector configured to detect a motion of a user on the bed main body; a second detector configured to detect a motion of a caregiver outside the bed main body; and a controller configured to control the driving unit based on the motion of the user detected by the first detector and the motion of the caregiver detected by the second detector.

Hereinafter, embodiments as examples are described with reference to the drawings.

The drawings are schematic or conceptual, and relations between the thickness and the width of portions, proportions of sizes among the portions, and the like are not necessarily the same as actual values thereof. The dimensions and the proportions may be illustrated differently among the drawings, even for the same portions.

In the description and the drawings, components similar to those described previously with reference to earlier drawings are denoted by the same reference numerals, and detailed descriptions thereof will be omitted as appropriate.

First Embodiment

FIG. 1 is a perspective view illustrating an example of a bed system 1. In the present embodiment, the bed system 1 includes a bed main body 10, a plurality of side rails (four side rails 21, 31, 41, and 51 in the present embodiment), and an AI camera (first detector) 61.

The bed main body 10 has a rectangular shape in a top view. In the present embodiment, the bed main body 10 is a motorized bed. The bed main body 10 includes a plurality of actuators (not illustrated in FIG. 1), a back section 11, a seat section 12, an upper leg section 13, a lower leg section 14, and a frame (not illustrated in FIG. 1). The back section 11 supports an abdomen from a back of a user who uses the bed main body 10. The seat section 12 supports a waist part of the user. The upper leg section 13 supports knee parts of the user. The upper leg section 13 operates in conjunction with the lower leg section 14, and the lower leg section 14 supports lower legs of the user. The frame is provided on lower sides of the back section 11, the seat section 12, the upper leg section 13, and the lower leg section 14.

Further, the bed main body 10 is provided with a head board 15 on a head side of the user and a foot board 16 on a foot side. The AI camera 61 is provided at an upper side of the foot board 16 and a central portion of the foot board 16 in a width direction. An imaging range of the AI camera 61 is a range in which at least the user on the bed main body 10 can be imaged. Further, in the present embodiment, the imaging range is also a range in which surroundings of a head board 15 side of the bed main body 10 can be imaged. Accordingly, it is possible to image motions of the user on the bed main body 10. Wheels (not illustrated) are provided on lower sides of four corners of the bed main body 10. Accordingly, a nurse or a caregiver or the like can move the bed system 1.

Four side rails are provided on side surfaces of the bed main body 10. The four side rails are fences for preventing the user from tumbling down from the bed main body 10. Specifically, the side rails 21 and 31 on the head side and the side rails 41 and 51 on the foot side are respectively provided on both side surfaces of the bed main body 10 along a longitudinal direction. The side rails 21 and 31 and the side rails 41 and 51 respectively include side rail main bodies 22, 32, 42, and 52, stays 27, 37, 47, and 57, and the like. The side rails 21 and 31 have a line-symmetrical structure with respect to a center line of the bed main body 10 in the width direction, and the side rails 41 and 51 similarly have a line-symmetrical structure. Although the side rails 21 and 31 and the side rails 41 and 51 have a line-symmetrical structure in the present embodiment, the embodiment is not limited to the line-symmetrical structure.

In the bed system 1, at least one side rail may only be provided on the bed main body even not four side rails. For example, when the bed system 1 is disposed along a wall surface, the side rail may not be provided on a wall surface side. Side rails may be provided on both sides of the bed main body 10 and the head side of the user, and the foot side may not be provided with a side rail. The number of side rails provided on the bed main body 10 may be changed depending on a state of the user or an arrangement of the bed system 1 in a room. In the present embodiment, a case is described in which four side rails (two side rails 21 and 31 on the head side and two side rails 41 and 51 on the foot side) can be provided on the bed main body 10, and more than four side rails may be provided.

Figure 2:
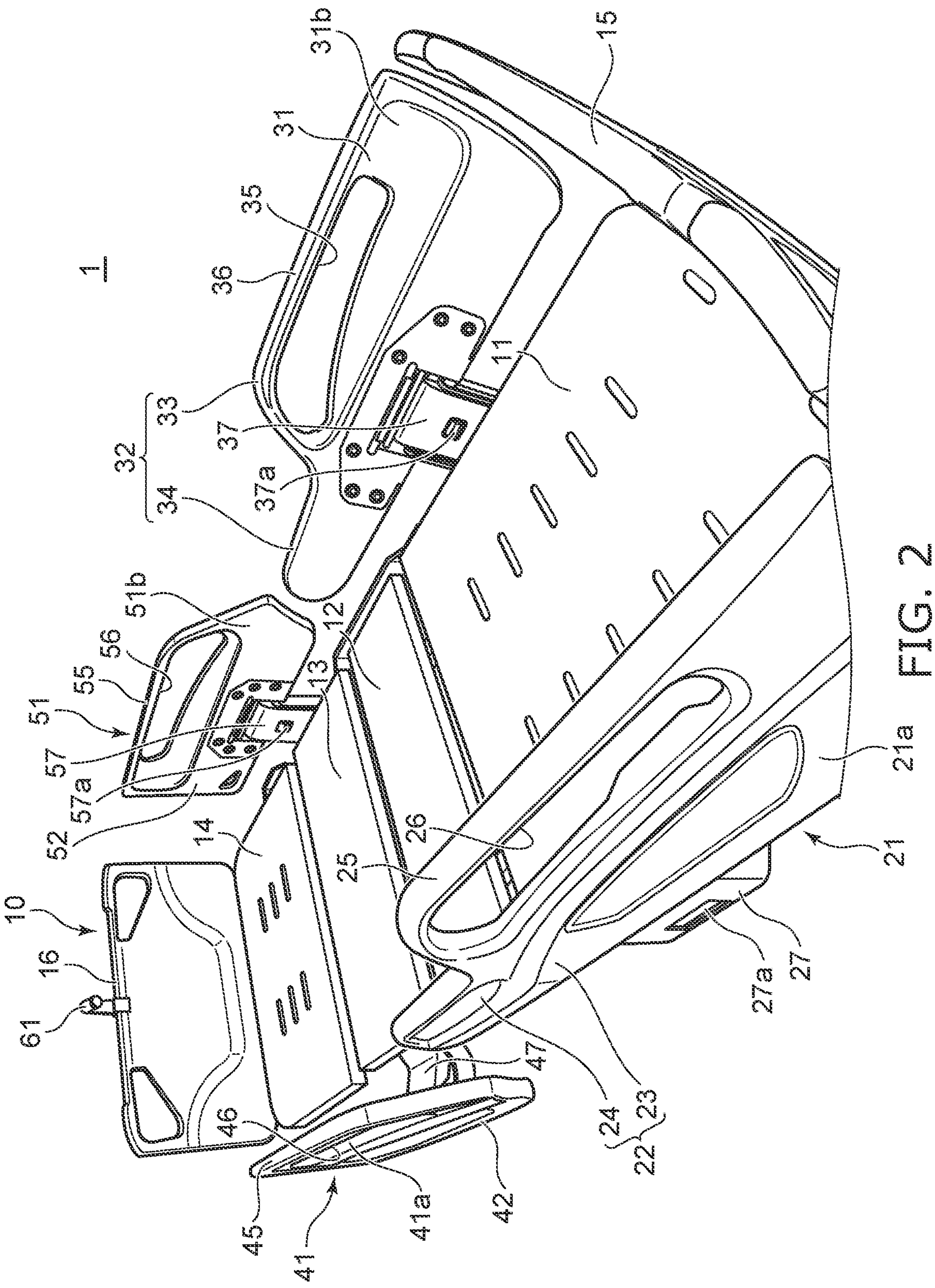
FIG. 2 is a perspective view illustrating an example of the bed system according to the first embodiment.

The four side rails 21, 31, 41, and 51 can operate in a vertical direction. FIG. 1 illustrates a state in which the four side rails 21, 31, 41, and 51 are all located at a first position (a position at which the side rails prevent the user from falling off the bed main body 10). FIG. 2 is a perspective view illustrating an example of the bed system 1 in a state in which the side rail 41 on the foot side is located at a second position (a position at which the side rail does not interfere with up and down motions of the user with respect to the bed main body 10). Although FIG. 2 illustrates a state in which only the side rail 41 is located at the second position, the other side rails 21, 31, and 51 can also similarly operate to the second position. In the present embodiment, the side rails 21, 31, 41, and 51 can operate in the vertical direction. Alternatively, a configuration with which the side rails are operated to the first position and the second position is not limited thereto. For example, the side rails may be provided on the bed main body 10 such that the side rails are pivotable about the longitudinal direction of the bed main body 10 from an upper surface to a lower surface of the bed main body 10. For example, the side rails may be provided on the bed main body 10 to be parallel to the upper surface of the bed main body 10 and pivotable in a lateral direction of the bed main body 10. In this manner, when the side rails are provided on the bed main body 10, the side rails can also operate between the first position and the second position.

The side rails 21, 31, 41, and 51 have first surfaces 21*a*, 31*a*, 41*a*, and 51*a* and second surfaces 21*b*, 31*b*, 41*b*, and 51*b*, respectively. Each of the first surfaces is a surface visually recognized from outside of the bed main body 10, and each of the second surfaces is a surface visually recognized from inside of the bed main body 10 (that is, a surface opposite to the first surface). In FIG. 1, the first surfaces 21*a* and 41*a* and the second surfaces 31*b* and 51*b* are illustrated.

Next, the side rails 21 and 31 on the head side will be described. Since the side rails 21 and 31 have a line-symmetrical structure, the side rail 21 will be described. The side rail main body 22 of the side rail 21 includes a first portion 23 having a first height and a second portion 24 having a second height smaller than the first height. The first portion 23 and the second portion 24 are continuously formed. A width of the first portion 23 is larger than a width of the second portion 24. Upper portions of the first portion 23 and the second portion 24 are formed with a handrail-shaped portion 25 having a curved shape. In the first portion 23, a hole 26 is provided on a lower side of the handrail-shaped portion 25. Due to the hole 26, the handrail-shaped portion 25 of the first portion 23 has a columnar shape, and the user can grasp the handrail-shaped portion 25.

The stay 27 is provided on a lower side of the first portion 23. The stay 27 is attached from a second surface 21*b* side of the first portion 23. The stay 27 is provided with a lock mechanism 27*a*. The lock mechanism 27*a* is disposed at a central portion of the stay 27.

Next, the side rails 41 and 51 on the foot side will be described. Since the side rails 41 and 51 have a line-symmetrical structure, the side rail 41 will be described. The side rail main body 42 of the side rail 41 has a shape corresponding to that of the first portion 23 of the side rail main body 22 on the head side, and is symmetrical with the first portion 23 on the bed main body 10 with respect to a center of the bed main body 10 in the longitudinal direction. The side rail main body 42 is formed with a handrail-shaped portion 45 having a curved shape on an upper side, and a hole 46 is provided on a lower side of the handrail-shaped portion 45. Due to the hole 46, the handrail-shaped portion 45 has a columnar shape, and the user can grasp this portion. The stay 47 attached to the side rail main body 42 is also provided with a lock mechanism 47*a*. The lock mechanism 47*a* is disposed at a central portion of the stay 47.

Figure 3:
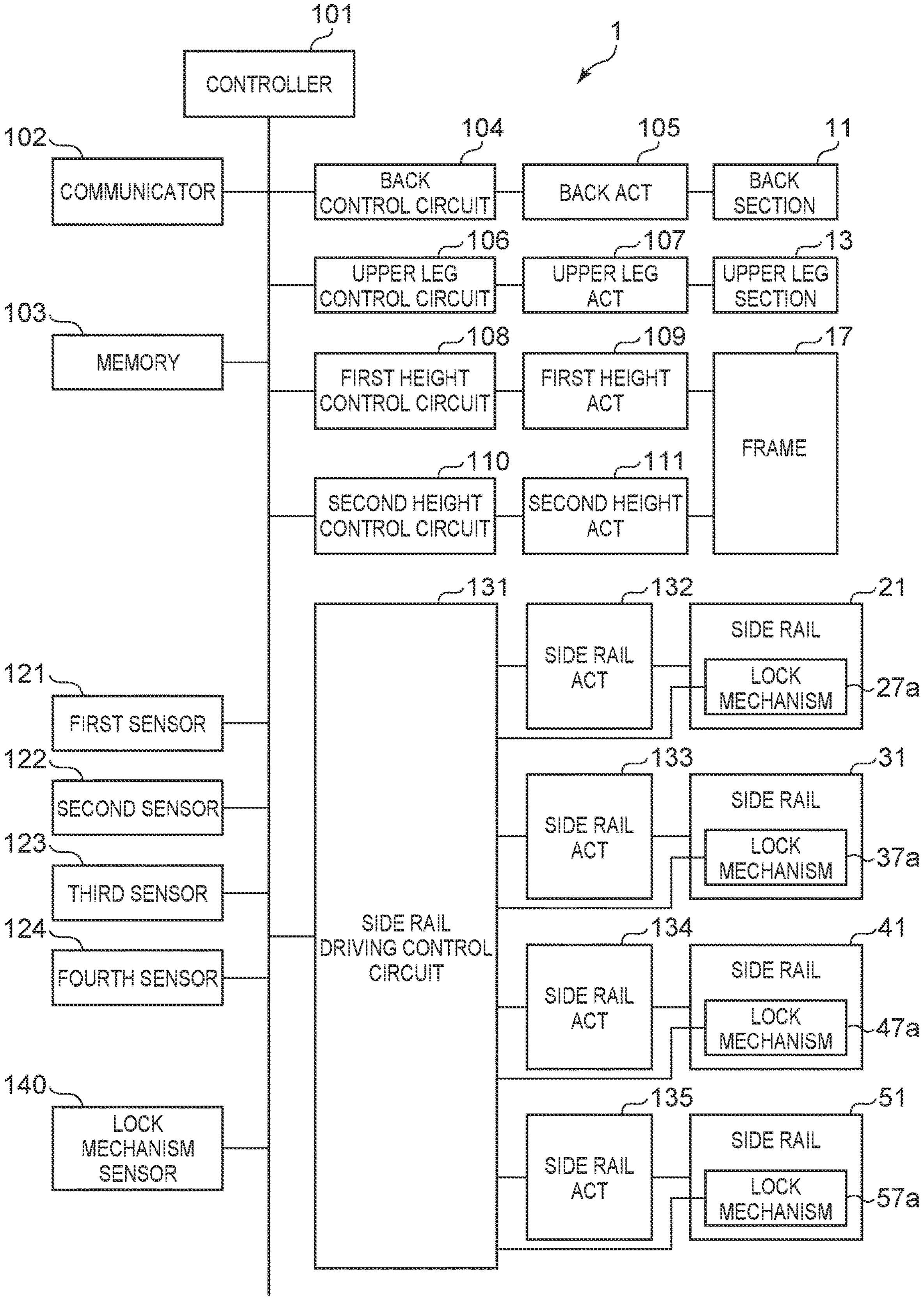
FIG. 3 is a diagram illustrating an example of a configuration of the bed system.

FIG. 3 is a diagram illustrating an example of a configuration of the bed system 1.

As illustrated in FIG. 3, the bed system 1 includes a controller 101, a communicator 102, a memory 103, a back control circuit 104, a back actuator (ACT) 105, the back section 11, an upper leg control circuit 106, an upper leg actuator (ACT) 107, the upper leg section 13, a first height control circuit 108, a first height actuator (ACT) 109, a second height control circuit 110, a second height actuator (ACT) 111, a frame 17, a first sensor 121, a second sensor 122, a third sensor 123, a fourth sensor 124, a side rail driving control circuit (driving unit) 131, a side rail actuator (ACT) 132, a side rail actuator (ACT) 133, a side rail actuator (ACT) 134, a side rail actuator (ACT) 135, the side rail 21, the side rail 31, the side rail 41, the side rail 51, and a lock mechanism sensor 140. The side rail 21, the side rail 31, the side rail 41, and the side rail 51 include the lock mechanism 27*a*, a lock mechanism 37*a*, the lock mechanism 47*a*, and a lock mechanism 57*a*, respectively.

Here, the lock mechanism 27*a*, the lock mechanism 37*a*, the lock mechanism 47*a*, and the lock mechanism 57*a* will be described. Since the lock mechanisms 27*a*, 37*a*, 47*a*, and 57*a* have the same configuration, the lock mechanism 27*a* will be described as an example.

Although the side rail ACT 132 can lock the side rail 21 at the first position, the side rail 21 can be manually operated by releasing a brake mechanism (not illustrated) of the side rail ACT 132. When the side rail 21 is manually operated in this manner, the lock mechanism 27*a* is used. By locking the lock mechanism 27*a*, the side rail 21 can be fixed at the first position. By unlocking the lock mechanism 27*a*, the bed system 1 can operate the side rail 21 from the first position illustrated in FIG. 1 to the second position. In this manner, the user or the like raises and locates the side rail 21 lowered to the second position to the first position, and then the side rail 21 is fixed at the first position again by locking the lock mechanism 27*a*. The lock mechanism sensor 140 includes four sensors that detect whether the lock mechanisms 27*a* to 57*a* are locked, respectively. The controller 101 can determine whether each of the lock mechanisms 27*a* to 57*a* is locked based on a detection result of the lock mechanism sensor 140.

The controller 101 includes a CPU, a ROM, a RAM, and the like. The controller 101 controls motions of the bed main body 10 and the side rails 21, 31, 41, and 51 based on instructions from an operation device (not illustrated). The communicator 102 is an interface for transmitting and receiving information to and from the operation device (not illustrated). The communicator 102 is an interface for transmitting and receiving information to and from the AI camera 61. The memory 103 stores various programs and various data. The various programs refer to, for example, a program for operating an angle of the back section 11, an angle of the upper leg section 13, and a height of the frame 17, and a program for operating the four side rails 21, 31, 41, and 51. The various data stores values (for example, lengths that allow the first height ACT 109 and the second height ACT 111 to operate) in a range in which, for example, the angle of the back section 11, the angle of the upper leg section 13, and the height of the frame 17 can be operated, and detection values of the first sensor 121 to the fourth sensor 124 at the first position and the second position.

The back control circuit 104 controls the back ACT 105 to operate the back section 11. The back section 11 supports a head part from the back of the user lying on the bed main body 10 and operates to raise the back of the user. The upper leg control circuit 106 controls the upper leg ACT 107 to operate the upper leg section 13. The upper leg section 13 operates to bend the knee parts of the user together with, for example, the lower leg section 14. The first height control circuit 108 controls the first height ACT 109 to control a height of the frame 17 on the head side. The second height control circuit 110 controls the second height ACT 111 to control a height of the frame 17 on the foot side. The first height ACT 109 and the second height ACT 111 are actuators for changing the height of the frame 17 of the bed main body 10. When the first height ACT 109 and the second height ACT 111 change by the same amount, the frame 17 operates in a height direction. By making a difference between the lengths of the first height ACT 109 and the second height ACT 111, the frame 17 operates to be inclined with respect to an installation surface of the bed main body 10.

The first sensor 121, the second sensor 122, the third sensor 123, and the fourth sensor 124 are provided on, for example, the side rail 21 on the head side, the side rail 31 on the head side, the side rail 41 on the foot side, and the side rail 51 on the foot side, respectively. Since the first sensor 121, the second sensor 122, the third sensor 123, and the fourth sensor 124 have the same configuration, the first sensor 121 will be described below.

The first sensor 121 detects a state of the side rail 21. Here, the state is, for example, whether the side rail 21 is located at the first position or the second position in the present embodiment. The first sensor 121 is, for example, any one of an atmospheric pressure sensor, an optical sensor, a magnetic sensor, a mercury switch, a ball switch, an infrared sensor, and an accelerometer. When any of the sensors is used, the sensor is attached to distinguish whether the side rail 21 is located at the first position or the second position. For example, when the first sensor 121 is an atmospheric pressure sensor, an atmospheric pressure at the first position and an atmospheric pressure at the second position may be detected. Therefore, the atmospheric pressure sensor may be provided inside the stay 27 or inside the side rail main body 22. When the first sensor 121 is an optical sensor, for example, the optical sensor may be provided at a position on the second surface **21*b* side of the side rail 21, at which the frame 17 cannot be detected at the first position while the frame 17 can be detected at the second position. A detection result detected by the first sensor 121 is transmitted to the controller 101**.

The side rail driving control circuit 131 controls motions of the side rail ACT 132 to the side rail ACT 135. The side rails ACT 132 to the side rail ACT 135 operate the side rail 21 to the side rail 51 from the first position to the second position or from the second position to the first position, respectively.

Figure 4:
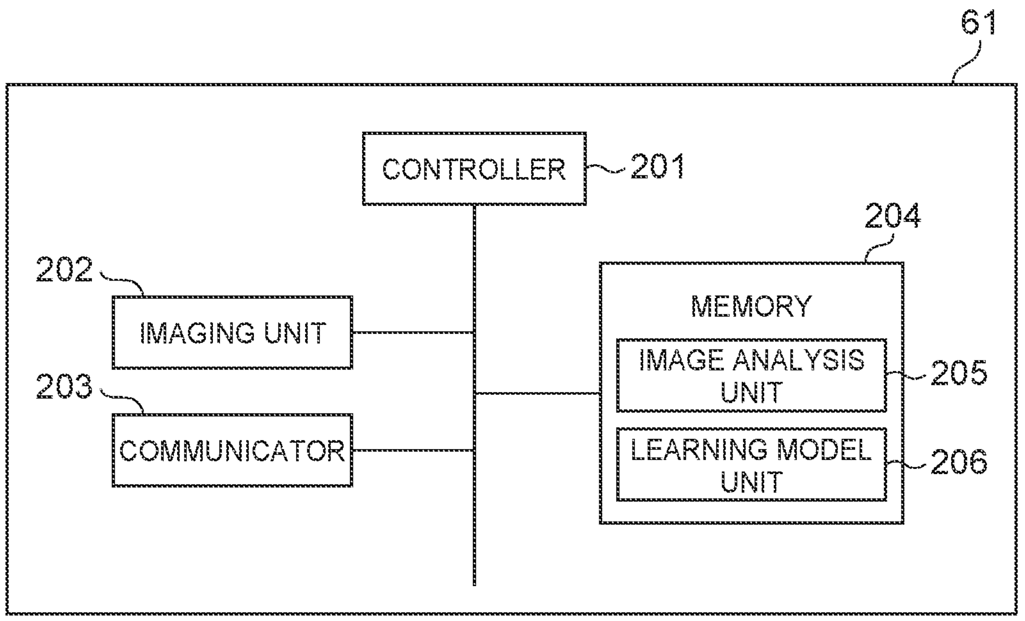
FIG. 4 is a diagram illustrating an example of a configuration of an AI camera.

FIG. 4 is a diagram illustrating an example of a configuration of the AI camera 61.

As illustrated in FIG. 4, the AI camera 61 includes a controller 201, an imaging unit 202, a communicator 203, and a memory 204. The memory 204 includes an image analysis unit 205 and a learning model unit 206.

The controller 201 includes a CPU, a ROM, a RAM, and the like. The controller 201 analyzes a captured image. In the present embodiment, the controller 201 analyzes a motion of the user on the bed main body 10. Information indicating a result of the image analysis is transmitted to the controller 101 of the bed main body 10. The imaging unit 202 images an area on the bed main body 10 and surroundings of the bed main body 10. The communicator 203 is an interface for transmitting information to the controller 101 of the bed main body 10. The memory 204 is a storage device such as a hard disk drive. The image analysis unit 205 stores programs, data, and the like for analyzing the motion of the user based on the captured image captured by the imaging unit 202. The learning model unit 206 stores a motion pattern of the user and images of a hand-holding item and clothes during the motion. The controller 201 can detect presence or absence and the motion of the user based on the analysis using the image analysis unit 205. For example, the controller 201 can detect whether the user is present on the bed main body 10, whether the user is sleeping, whether the motion is a sit-up motion, or whether the motion is a bed-departure motion. The learning model unit (motion pattern memory) 206 stores the motion pattern of the user and the images of the hand-holding item, the clothes, and the like during the motion. When the controller 201 performs the image analysis, the controller (prediction unit) 201 can predict a motion of the user by comparing with the motion pattern and the like. In the bed system 1 according to the present embodiment, a motion of the user is predicted and motions of the side rails 21 to 51 to be described later are controlled. Alternatively, the motion of the user may be determined and the motions of the side rails 21 to 51 may be controlled based on the captured image. In the present embodiment, although a case is described in which the image analysis is performed by the AI camera 61, the embodiment is not limited thereto. For example, the controller 101 of the bed main body 10 may analyze an image captured by a camera. For example, an image captured by the camera may be transmitted to an analysis server connected to a network, the analysis server may analyze the image, and the bed main body 10 may receive an analysis result from the analysis server via the network.

Next, control of the bed system 1 will be described. The controller 101 normally receives information (hereinafter, referred to as "image analysis result information") indicating an image analysis result based on an image captured by the AI camera 61, and operates the side rails 21, 31, 41, and 51 based on the received image analysis result information. The image analysis result information includes, in addition to information indicating whether the user is present on the bed main body 10 and information indicating that the user is present when the user is present on the bed main body 10, information indicating that the user is sleeping, information indicating the sit-up motion, information indicating the bed-departure motion, and the like. Hereinafter, four processes will be described, and the bed system 1 may only execute at least one process.

Figure 5:
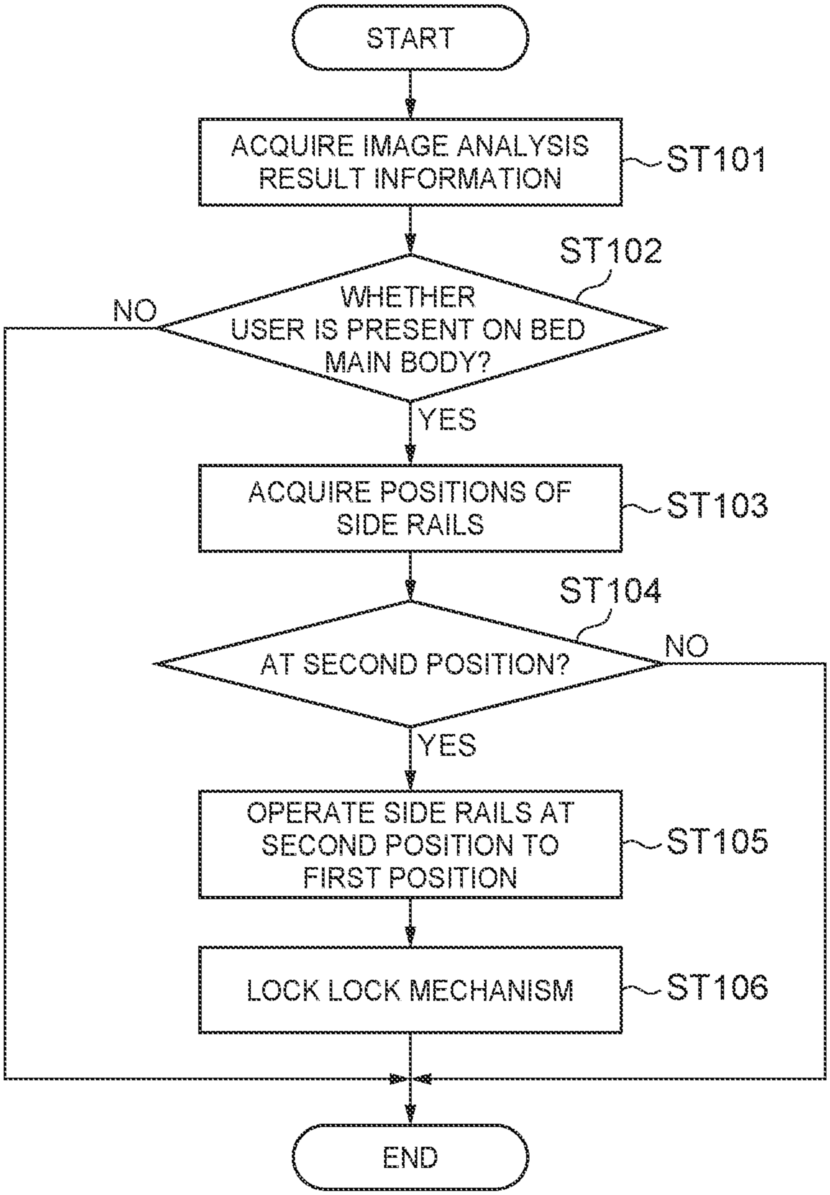
FIG. 5 is a flowchart illustrating an example of a process.

FIG. 5 is a flowchart illustrating an example of a process when the user is present on the bed main body 10. The process can be turned on and off by an operation of a nurse or the like in accordance with a state of the user, and can be turned on and off by an operation of the user.

As illustrated in FIG. 5, the controller 101 acquires image analysis result information (ST101). The controller 101 acquires the image analysis result information from the AI camera 61 via the communicator 102. Here, the image analysis result information includes the information indicating whether the user is present on the bed main body 10.

Next, the controller 101 determines whether the user is present on the bed main body 10 based on the image analysis result information received from the AI camera 61 (ST102). When the controller 101 determines that the user is absent on the bed main body 10 (ST102: NO), the process ends.

When determining that the user is present on the bed main body 10 (ST102: YES), the controller 101 acquires positions of the side rails 21 to 51 (ST103). For example, the controller 101 acquires position information on the side rails 21 to 51 from the first sensor 121 to the fourth sensor 124, respectively. Here, the position information is information indicating whether each of the side rails 21 to 51 is located at the first position or the second position.

Next, the controller 101 determines whether each of the side rails 21 to 51 is located at the second position (ST104). When determining that the side rail is located at the second position (ST104: YES), the controller 101 operates the side rail at the second position to the first position (ST105). For example, the controller 101 transmits an instruction to the side rail driving control circuit 131 to operate the side rail located at the second position to the first position. When receiving the instruction, the side rail driving control circuit 131 causes an instructed side rail ACT to operate the side rail to the first position. Accordingly, the side rail at the second position is located at the first position.

When operating the side rail to the first position (ST105), the controller 101 locks the lock mechanism of the side rail operated to the first position (ST106). For example, when operating the side rail 21 from the second position to the first position, the controller 101 transmits an instruction to lock the lock mechanism 27*a* via the side rail driving control circuit 131. Accordingly, the lock mechanism 27*a* is locked, and the side rail 21 is fixed at the first position.

When the controller 101 locks the lock mechanism of the side rail (ST106), or when the controller 101 determines that none of the side rails 21 to 51 is located at the second position, that is, all of the side rails 21 to 51 are located at the first position (ST104: NO), the process ends.

By executing the process, when the user is present on the bed main body 10, the bed system 1 can automatically operate the side rails 21, 31, 41, and 51 located at the second position to the first position even though the user forgets to raise the side rails. Therefore, the bed system 1 can prevent an unexpected situation such as falling or tumbling of the user on the bed main body 10.

Figure 6:
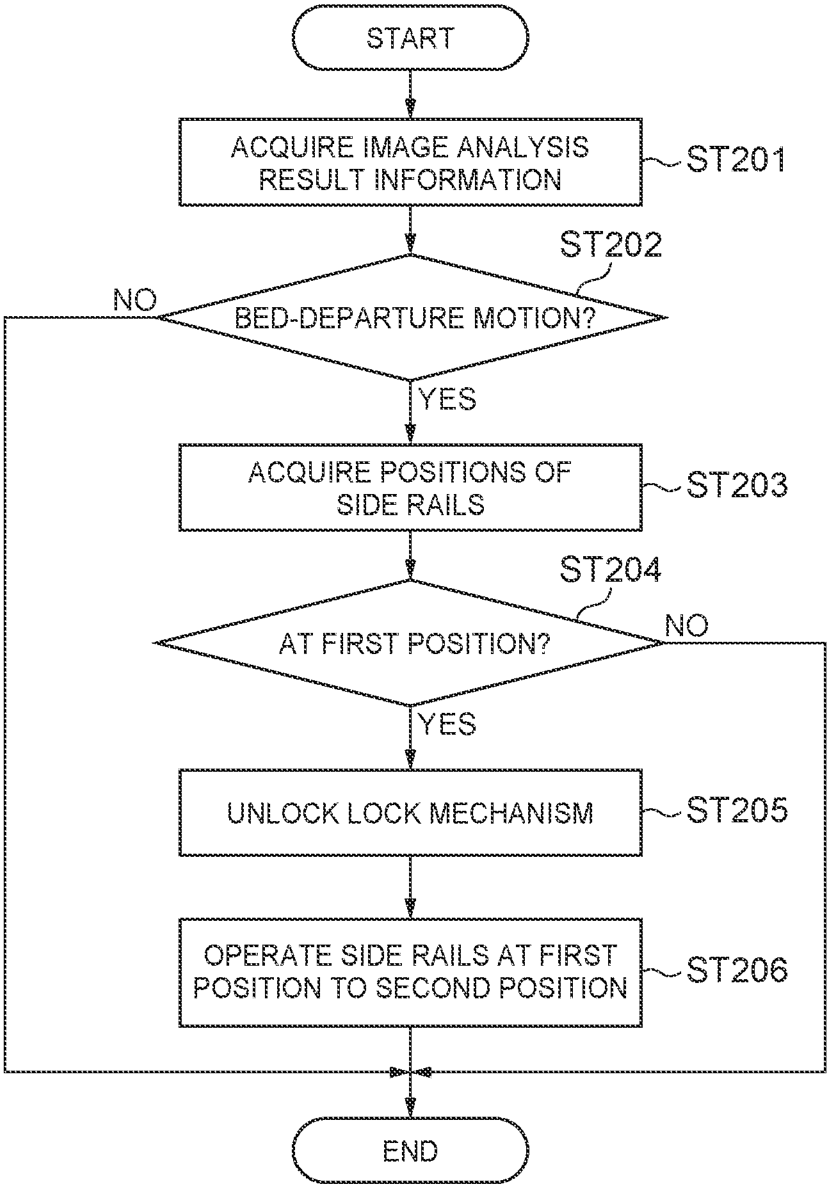
FIG. 6 is a flowchart illustrating an example of a process.

FIG. 6 is a flowchart illustrating an example of a process when the user on the bed main body 10 departs from the bed.

As illustrated in FIG. 6, the controller 101 acquires image analysis result information (ST201). The controller 101 acquires the image analysis result information from the AI camera 61 via the communicator 102. Here, the image analysis result information includes information indicating whether the user is present and information about whether the bed-departure motion is indicated when the user is present.

Next, the controller 101 determines whether the motion of the user is the bed-departure motion based on the image analysis result information (ST202). When the controller 101 determines that the user does not perform the bed-departure motion (ST202: NO), the process ends.

When determining that the motion of the user is the bed-departure motion (ST202: YES), the controller 101 acquires positions of the side rails 21 to 51 (ST203). The processing is the same as the processing in step ST103 described above.

Next, the controller 101 determines whether each of the side rails 21 to 51 is located at the first position (ST204). When determining that the side rail is located at the first position (ST204: YES), the controller 101 unlocks the lock mechanism of the side rail located at the first position (ST205), and operates the side rail in which the lock mechanism is unlocked from the first position to the second position (ST206).

When the controller 101 operates the side rail to the second position (ST206) or when the controller 101 determines that none of the side rails 21 to 51 is located at the first position, that is, all of the side rails 21 to 51 are located at the second position (ST204: NO), the process ends.

By executing the process, when the user on the bed main body 10 departs from the bed, the bed system 1 can automatically operate the side rails 21, 31, 41, and 51 located at the first position to the second position even though the user does not lower the side rails. Therefore, when the user on the bed main body 10 departs from the bed, it is possible to prevent an unexpected situation such as falling or tumbling when the side rails is unlocked. Although a case is described in which all of the side rails 21 to 51 are located at the second position when the user departs from the bed, the embodiment is not limited thereto. When it is preferable that the side rails are located at the first position when the user departs from the bed, for example, a case may also be conceived in which predetermined side rail plays a role of a grip when the user departs from the bed. Therefore, the bed system 1 may not operate all of the side rails 21 to 51 to the second position when the user departs from the bed.

Figure 7:
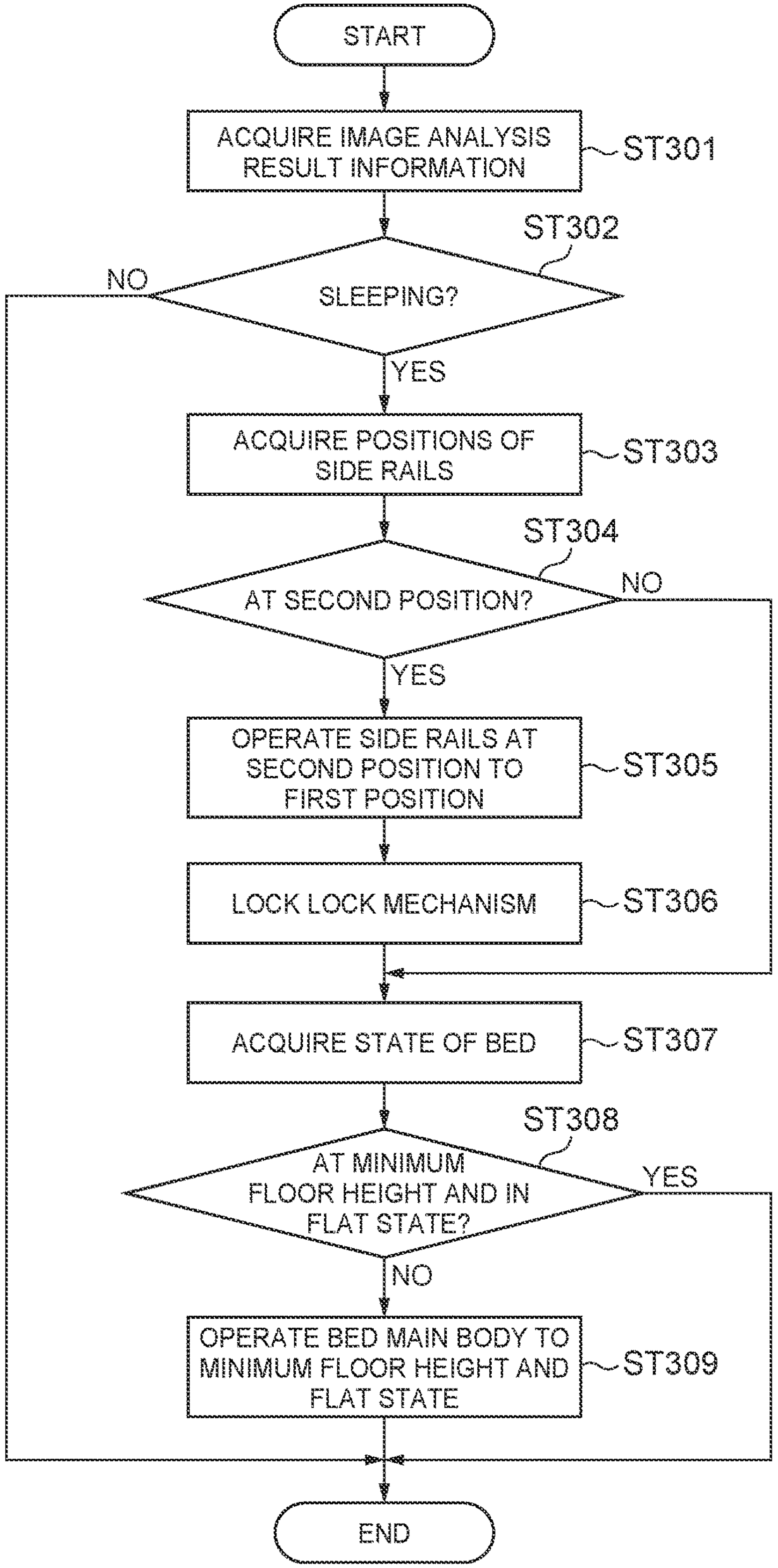
FIG. 7 is a flowchart illustrating an example of a process.

FIG. 7 is a flowchart illustrating an example of a process when the user on the bed main body 10 is sleeping.

As illustrated in FIG. 7, the controller 101 acquires image analysis result information (ST301). The controller 101 acquires the image analysis result information from the AI camera 61 via the communicator 102. Here, the image analysis result information includes information indicating whether the user is present and information indicating whether the user is sleeping when the user is present.

Next, the controller 101 determines whether the user is sleeping based on the image analysis result information (ST302). When the controller 101 determines that the user is not sleeping (ST302: NO), the process ends.

When determining that the user is sleeping (ST302: YES), the controller 101 acquires positions of the side rails 21 to 51 (ST303). Next, the controller 101 determines whether each of the side rails 21 to 51 is located at the second position (ST304). When determining that the side rail is located at the second position (ST304: YES), the controller 101 operates the side rail at the second position to the first position (ST305). When operating the side rail to the first position, the controller 101 locks the lock mechanism of the side rail operated to the first position (ST306). The processing in steps ST303 to ST306 is the same as the processing in steps ST103 to ST106 described above.

When the controller 101 locks the side rail operated to the first position (ST306), or when the controller 101 determines that there is no side rail located at the second position (ST304: NO), the controller 101 acquires a state of the bed (ST307). Here, the state of the bed includes a floor height of the bed main body 10 and the angles of the back section 11 and the upper leg section 13. The controller 101 obtains the floor height of the bed main body 10 based on, for example, current lengths of the first height ACT 109 and the second height ACT 111. Therefore, for example, the controller 101 acquires the current lengths of the first height ACT 109 and the second height ACT 111 from the first height control circuit 108 and the second height control circuit 110, respectively, and obtains the current floor height. Further, for example, the controller 101 acquires a length of the back ACT 105 and a length of the upper leg ACT 107 from the back control circuit 104 and the upper leg control circuit 106, respectively, t angles of the back section 11 and the upper leg section 13.

Next, the controller 101 determines whether the bed main body 10 is at a minimum floor height and in a flat state (ST308). The minimum floor height is a height in a state in which the height of the bed main body 10 is the smallest. In other words, the lengths of the first height ACT 109 and the second height ACT 111 are the smallest. For example, the controller 101 can determine whether the height is the minimum floor height based on whether the current lengths of the first height ACT 109 and the second height ACT 111, which are acquired from the first height control circuit 108 and the second height control circuit 110, respectively, are the smallest lengths. The flat state is a state in which the lengths of the back ACT 105 and the upper leg ACT 107 are the smallest. In other words, the back section 11, the seat section 12, the upper leg section 13, and the lower leg section 14 that constitute the upper surface of the bed main body 10 are substantially flat. For example, the controller 101 can determine whether the bed main body 10 is in the flat state based on whether the current length of the back ACT 105 and the current length of the upper leg ACT 107, which are acquired from the back control circuit 104 and the upper leg control circuit 106, are the smallest lengths.

When determining that the bed main body 10 is neither at the minimum floor height nor in the flat state (ST308: NO), the controller 101 operates the height of the bed main body 10 to the minimum floor height and the flat state (ST309). For example, the controller 101 transmits instructions to the first height control circuit 108 and the second height control circuit 110 to minimize the lengths of the first height ACT 109 and the second height ACT 111. Accordingly, the first height control circuit 108 and the second height control circuit 110 operate to minimize the lengths of the first height ACT 109 and the second height ACT 111. Further, for example, the controller 101 transmits instructions to the back control circuit 104 and the upper leg control circuit 106 to minimize the lengths of the back ACT 105 and the upper leg ACT 107. Accordingly, the back control circuit 104 and the upper leg control circuit 106 operate to minimize the lengths of the back ACT 105 and the upper leg ACT 107. Accordingly, the bed main body 10 is at the minimum floor height and in the flat state. When the bed main body 10 reaches the minimum floor height and enters the flat state (ST309), or when the controller 101 determines that the bed main body 10 is at the minimum floor height and in the flat state (ST308: YES), the process ends.

By executing the process, when the user on the bed main body 10 is sleeping, the bed system 1 can automatically operate the side rails 21, 31, 41, and 51 located at the second position to the first position even though the user forgets to lower the side rails. Therefore, it is possible to prevent a situation in which the user on the bed main body 10 falls off the bed main body 10 during sleep. Further, when the user is sleeping, the bed system 1 can automatically locate the bed main body 10 at the minimum floor height and in the flat state. Accordingly, even though a situation occurs in which the user unconsciously passes over the side rails 21, 31, 41, and 51 and falls off, it is possible to minimize an influence.

In the flowchart illustrated in FIG. 7, although the controller 101 operates the side rails 21 to 51 to the first position and locks the lock mechanism of the operated side rails (ST303 to ST306), and then the state of the bed main body 10 is set to the flat state at the minimum floor height (ST307 to ST309), the embodiment is not limited thereto. For example, the processing in (ST303 to ST306) and the processing in (ST307 to ST309) may be reversed, that is, the controller 101 may set the state of the bed main body 10 to the flat state at the minimum floor height, and then operate the side rails 21 to 51 to the first position and lock the lock mechanism of the operated side rails, or the processing in (ST303 to ST306) and the processing (ST307 to ST309) may be simultaneously performed, that is, the controller 101 may operate the side rails 21 to 51 to the first position and lock the lock mechanism of the operated side rails while setting the state of the bed main body 10 to the flat state at the minimum floor height.

Figure 8:
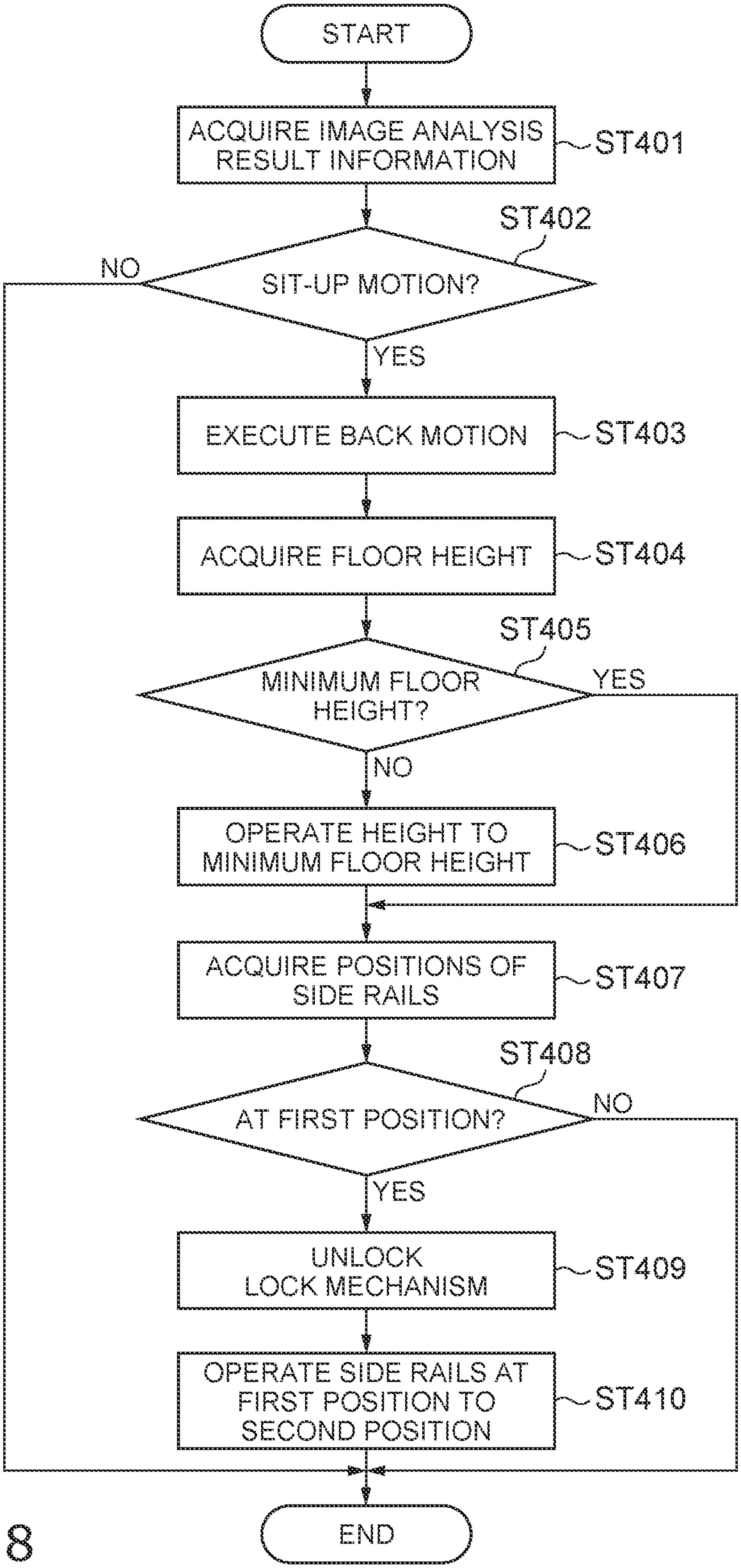
FIG. 8 is a flowchart illustrating an example of a process.

FIG. 8 is a flowchart illustrating an example of a process when the user on the bed main body 10 sits up.

As illustrated in FIG. 8, the controller 101 acquires image analysis result information (ST401). The controller 101 acquires the image analysis result information from the AI camera 61 via the communicator 102. Here, the image analysis result information includes information indicating whether the user is present and information about whether the bed-departure motion is indicated when the user is present.

Next, the controller 101 determines whether the motion of the user is a sit-up motion based on the image analysis result information (ST402). When the controller 101 determines that the user does not perform the sit-up motion (ST402: NO), the process ends.

When determining that the motion of the user is the sit-up motion (ST402: YES), the controller 101 executes a back motion (ST403). The back motion is a motion of raising the back section 11 upward and lifting the back from the head part of the user. Next, the controller 101 acquires the floor height of the bed main body 10 (ST404) and determines whether the height is the minimum floor height (ST405). When determining that the height is not the minimum floor height (ST405: NO), the controller 101 operates the height of the bed main body 10 to the minimum floor height (ST406). The processing in steps ST404 to ST406 is the same as the processing of operating the floor height to the minimum floor height in steps ST307 to ST309 described above.

When the height of the bed main body 10 reaches the minimum floor height (ST406), or when the controller 101 determines that the bed main body 10 is at the minimum floor height (ST405: YES), the controller 101 acquires positions of the side rails 21 to 51 (ST407). Next, the controller 101 determines whether each of the side rails 21 to 51 is located at the first position (ST408). When determining that the side rail is located at the first position (ST408: YES), the controller 101 unlocks the lock mechanism of the side rail located at the first position (ST409), and operates the side rail at the first position in which the lock mechanism is unlocked to the second position (ST410). The processing in steps ST407 to ST410 is the same as the processing in steps ST203 to ST206 described above. When the controller 101 operates the side rail at the first position to the second position (ST410), or when the controller 101 determines that none of the side rails 21 to 51 is located at the first position, that is, all of the side rails 21 to 51 are located at the second position (ST408: NO), the process ends.

By executing the process, when the user on the bed main body 10 sits up, the bed system 1 can automatically operate the side rails 21, 31, 41, and 51 located at the first position to the second position even though the user does not lower the side rails. Therefore, when the user gets off the bed main body 10, it is possible to prevent a situation in which the user collides with the side rails 21, 31, 41, and 51 and tumbles down from the bed main body 10. Further, when the user sits up, the bed system 1 can automatically locate the height of the bed main body 10 at the minimum floor height. Accordingly, when the user gets off the bed main body 10, even though the user tumbles over due to a situation such as shaking, it is possible to minimize the influence. Although the controller 101 operates the side rails 21 to 51 from the first position to the second position after operating the bed main body 10 to the minimum floor height, the controller 101 may operate the bed main body 10 to the minimum floor height after operating the side rails 21 to 51 to the second position. Accordingly, it is possible to prevent the user from falling off the bed main body 10 when the bed main body 10 is operated.

In the flowchart illustrated in FIG. 8, the controller 101 sets the state of the bed main body 10 to the minimum floor height (ST404 to ST406), and then operates the side rails 21 to 51 to the second position (ST407 to ST410), and the embodiment is not limited thereto. For example, the processing in (ST404 to ST406) and the processing in (ST407 to ST410) may be reversed, that is, the controller 101 may operate the side rails 21 to 51 to the second position and then set the state of the bed main body 10 to the minimum floor height, or the processing in (ST404 to ST406) and the processing in (ST407 to ST410) may be simultaneously performed, that is, the controller 101 may operate the side rails 21 to 51 to the second position while setting the state of the bed main body 10 to the minimum floor height.

Although a case is described in which all of the side rails 21 to 51 are located at the second position when the user sits up, the embodiment is not limited thereto. When it is preferable that the side rails are located at the first position when the user sits up, for example, a case may also be conceived in which a predetermined side rail plays a role of a grip when the user sits up. Therefore, the bed system 1 may not operate all of the side rails 21 to 51 to the second position when the user sits up.

As described above, according to the bed system 1, it is possible to prevent the user who uses the bed main body 10 from tumbling over or falling off. Since the AI camera 61 is provided on the foot board 16, an entire body of the user including a face can be imaged, and processing accuracy of the image analysis unit 205 can be improved.

Second Embodiment

A second embodiment is different from the first embodiment in that a bed system includes two AI cameras. Hereinafter, configurations and processes different from those according to the first embodiment will be described in detail, configurations similar to those according to the first embodiment will be denoted by the same reference numerals, and detailed descriptions thereof will be omitted.

Figure 9:
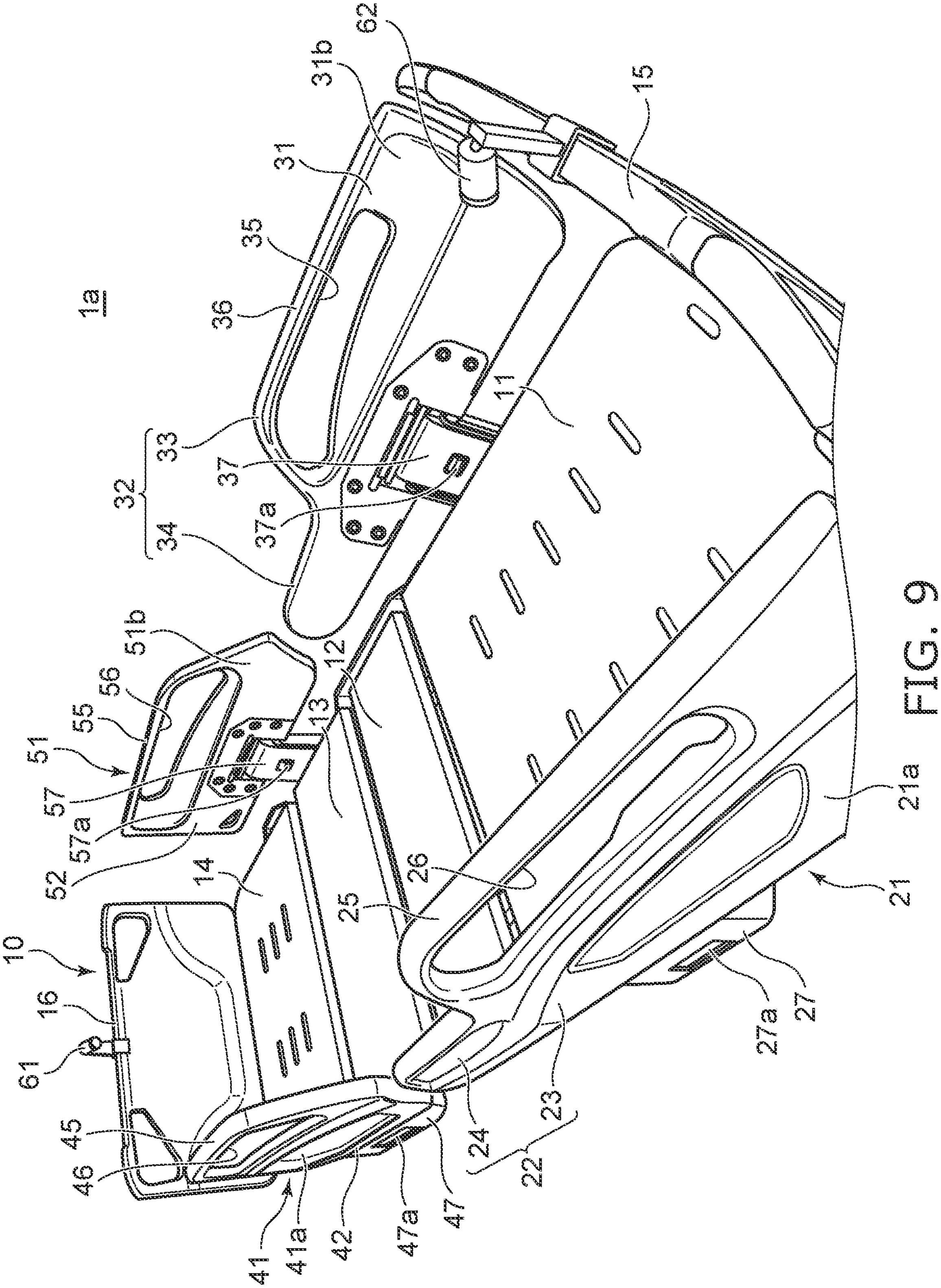
FIG. 9 is a perspective view illustrating an example of a bed system according to a second embodiment.

FIG. 9 is a perspective view illustrating an example of a bed system 1*a*. In the present embodiment, the bed system 1*a* includes the bed main body 10, a plurality of side rails (four side rails 21, 31, 41, and 51 in the present embodiment), the AI camera (first detector) 61, and an AI camera (second detector) 62.

Figure 10:
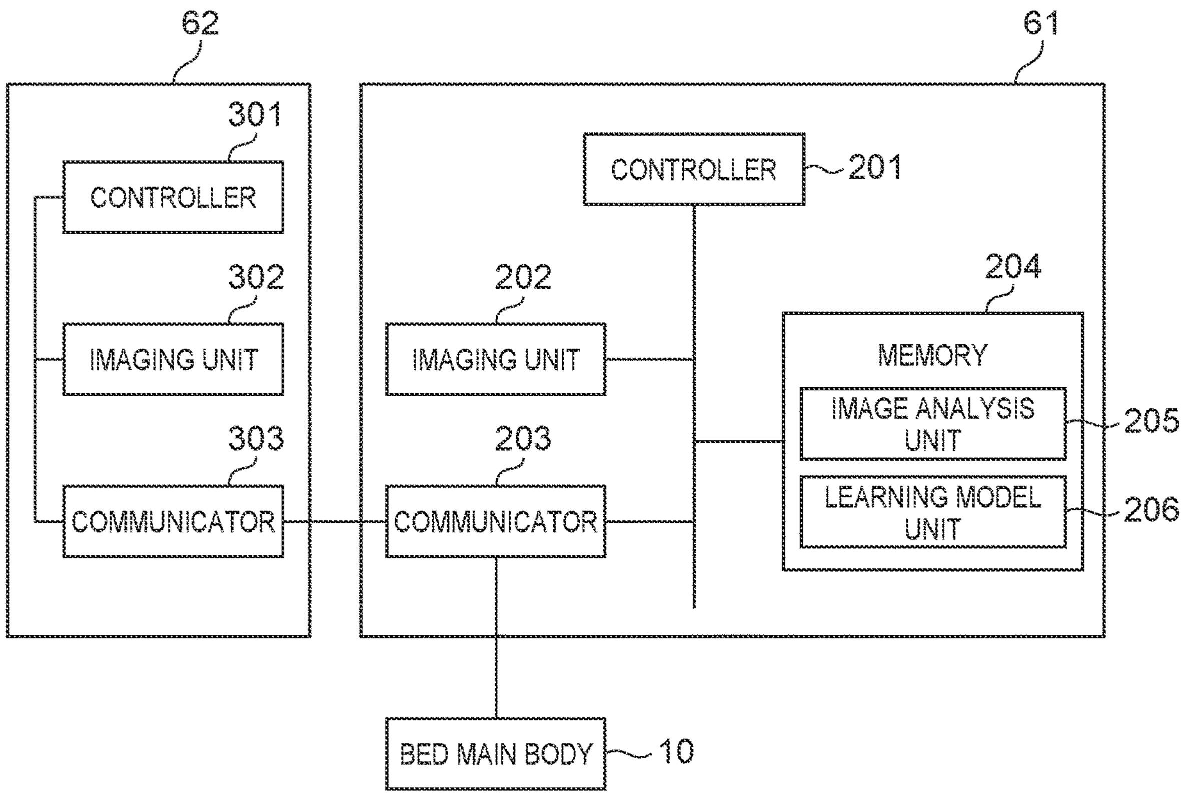
FIG. 10 is a diagram illustrating an example of configurations of two AI cameras.

As illustrated in FIG. 9, the AI camera 62 is attached to the head board 15. An imaging range of the AI camera 62 is a range in which a user on the bed main body 10 and surroundings of a foot board 16 side of the bed main body 10 can be imaged. The AI cameras 61 and 62 can image the surroundings of the bed main body 10 in addition to the user on the bed main body 10. FIG. 10 is a diagram illustrating an example of configurations of the two AI cameras 61 and 62. As illustrated in FIG. 10, in the present embodiment, the AI camera 62 includes a controller 301, an imaging unit 302, and a communicator 303. The communicator 303 communicably is connected to the communicator 203 of the AI camera 61. An image captured by the AI camera 62 is transmitted to the AI camera 61, and the AI camera 61 performs image analysis, motion prediction, and the like on the image. Accordingly, the AI camera 61 can analyze, by the image analysis unit 205, not only a motion of the user on the bed main body 10 but also a motion of a doctor, a nurse, or the like located around the bed main body 10.

The controller 201 can predict the motion of the doctor or the nurse in addition to the motion of the user by storing a motion pattern of the doctor or the nurse or the like, and images of a hand-holding item, clothes, and the like during the motion in the learning model unit 206. Therefore, image analysis result information transmitted from the AI camera 61 to the bed main body 10 includes, in addition to information indicating whether the user is present on the bed main body 10 and information indicating that the user is present when the user is present on the bed main body 10, information indicating whether the user is sleeping, information indicating a sit-up motion, information indicating a bed-departure motion, and the like, information indicating whether the doctor or the nurse is present, and information indicating a height and a motion of the doctor or the nurse when the doctor or the nurse is present. The information indicating the motion of the doctor or the nurse is, for example, information indicating a motion of conveying the bed main body 10 and information indicating a motion of performing a treatment on the user by the doctor or the nurse. Here, the information indicating the height is, for example, information for recognizing a set value (for example, a position of a seat part of the nurse) or whether there is a target (a mattress or the like) as a guide and identifying whether the recognized information is at an appropriate predetermined position.

Figure 11:
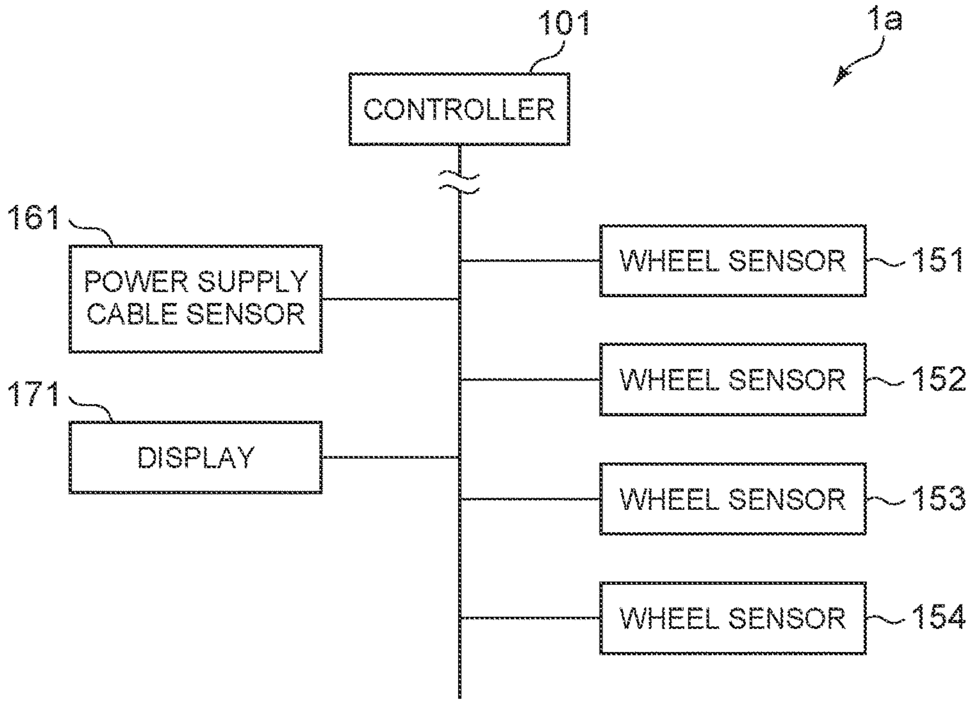
FIG. 11 is a diagram illustrating an example of a configuration added to the bed system in FIG. 3.

FIG. 11 is a diagram illustrating an example of a configuration added to the bed system 1 in the present embodiment.

As illustrated in FIG. 11, the bed system 1*a* includes wheel sensors 151, 152, 153, and 154, a power supply cable sensor 161, and a display 171. The controller 101 is connected to the wheel sensors 151, 152, 153, and 154, the power supply cable sensor 161, and the display 171. In FIG. 11, illustration of the configuration illustrated in FIG. 3 excluding the controller 101 is omitted.

The wheel sensors 151 to 154 are sensors that detect whether wheels (not illustrated) provided at four corners on a lower side of the bed main body 10 are locked. For example, the wheels are provided with a pedal, which includes a first end portion serving as a lock mechanism and a second end portion. When the nurse or the like steps on the first end portion, the lock mechanism is locked and the wheels are not driven. When the nurse or the like steps on the second end portion, the lock mechanism is unlocked and the wheels are driven. Any configuration for detecting whether the lock mechanism is in a locked state in which the lock mechanism is locked or in an unlocked state in which the lock mechanism is unlocked may be used, and for example, the wheel sensors 151 to 154 may detect a distance between the wheels and the second end portion of the pedal by a magnet switch. Detection results detected by the wheel sensors 151 to 154 are transmitted to the controller 101.

The power supply cable sensor 161 is a sensor that detects whether a power supply cable (not illustrated) that supplies power to the bed main body 10 is received by a cable receiver (not illustrated). The power supply cable is a cable that connects an outlet provided on a wall surface to the bed main body 10. The power supply cable sensor 161 detects a state in which the power supply cable is received by the cable receiver and a state in which the power supply cable is not received by the cable receiver. A detection result of the power supply cable sensor 161 is transmitted to the controller 101.

The display 171 notifies the nurse or the like of information about the bed system 1*a*. The display 171 displays, for example, information indicating whether the wheel sensors 151 to 154 are in the locked state or the unlocked state, and information indicating a detection state indicating a state in which the power supply cable is detected or a non-detection state indicating a state in which the power supply cable is not detected. For example, the display 171 may be provided with lamps corresponding to the wheel sensors 151 to 154 and the power supply cable sensor 161, and may give a notification of, by turning on or turning off the lamps, the locked state or the unlocked state of the wheel sensors 151 to 154 and the detection state or the non-detection state of the power supply cable sensor 161. Even in a state in which the power supply cable (not illustrated) is not connected to the outlet, the display 171 can display information for a certain period of time, for example, using a rechargeable battery that is provided in the bed main body 10.

Figure 12:
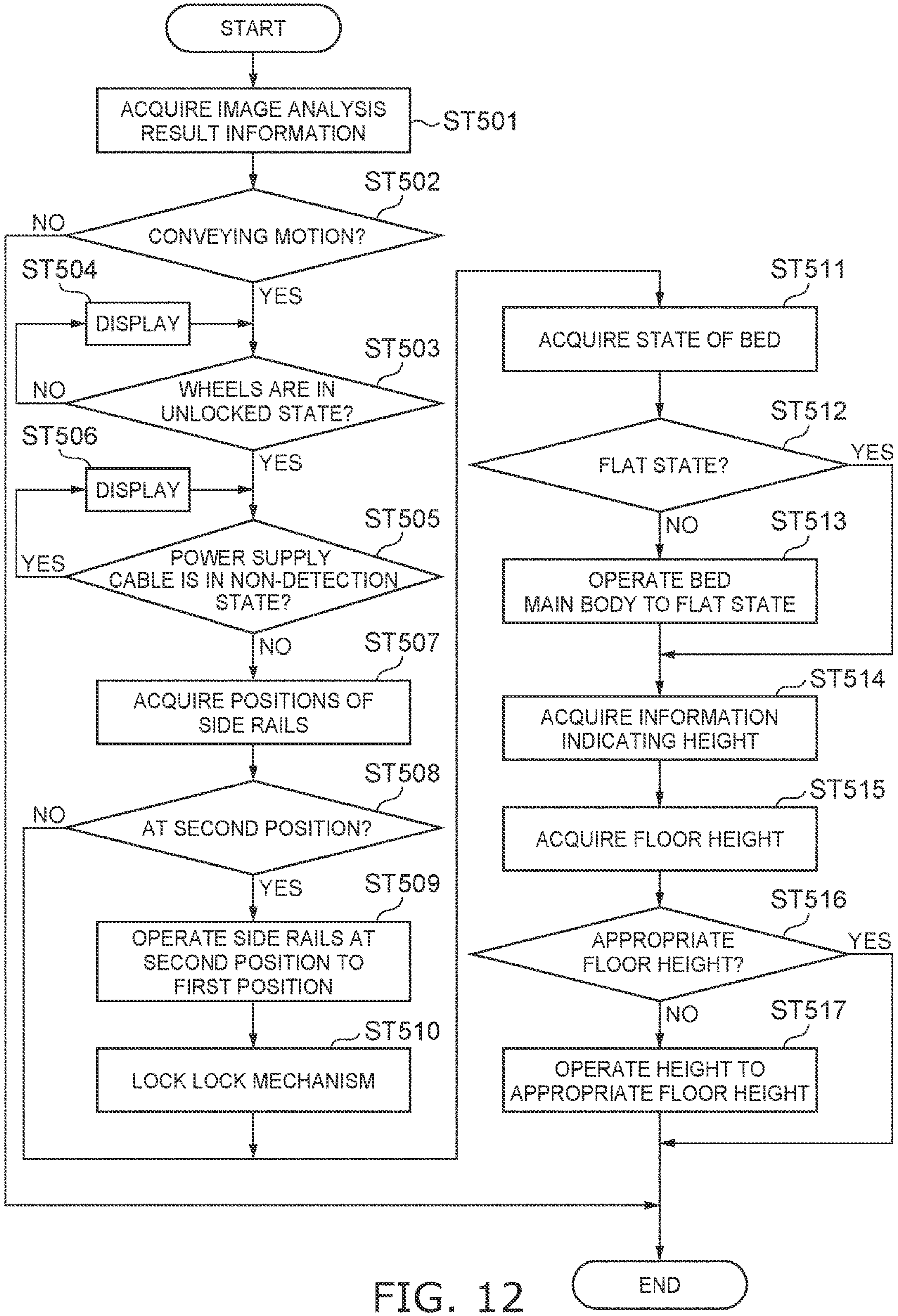
FIG. 12 is a flowchart illustrating an example of a process.

FIG. 12 is a flowchart illustrating an example of a process when the nurse conveys the bed system 1*a*.

As illustrated in FIG. 12, the controller 101 acquires image analysis result information (ST501). The controller 101 acquires the image analysis result information from the AI camera 61 via the communicator 102. Here, the image analysis result information includes information indicating whether the nurse is present, and information about whether the motion of conveying the bed main body 10 is indicated when the nurse is present.

Next, the controller 101 determines whether the motion of the nurse is a conveying motion based on the image analysis result information (ST502). When the controller 101 determines that the nurse is not performing the conveying motion (ST502: NO), the process ends.

When determining that the nurse is performing the conveying motion (ST502: YES), the controller 101 determines whether the wheels are in the unlocked state based on the information transmitted from the wheel sensors 151 to 154 (ST503). When determining that the wheels are in the unlocked state (ST503: YES), the controller 101 determines whether the power supply cable is in the non-detection state based on the information transmitted from the power supply cable sensor 161 (ST505). When determining that the wheels are not in the unlocked state (ST503: NO), the controller 101 causes the display 171 to display that the wheels are not in the unlocked state (ST504). When determining that the power supply cable is in the non-detection state (ST505: YES), the controller 101 causes the display 171 to display that the power supply cable is in the non-detection state (ST506). For example, by providing the display 171 with the lamps corresponding to respective states and turning on or turning off the lamps, a fact that the wheels are not in the unlocked state and a fact that the power supply cable is in the non-detection state may be indicated. Accordingly, after the display 171 displays the information, the process returns to steps ST503 and ST505 accordingly. In this manner, when no wheel is in the unlocked state, as well as when the power supply cable is not accommodated in the cable receiver, a corresponding lamp on the display 171 is turned on. The nurse unlocks the wheels, or accommodates the power supply cable in the cable receiver corresponding to the lamp that is turned on. As a result, the lamp on the display 171 is turned off. Accordingly, the nurse can visually recognize a state in which the bed system 1*a* may be conveyed.

When determining NO in step ST505, that is, when the power supply cable is in the detection state, the controller 101 acquires positions of the side rails 21 to 51 (ST507). Next, the controller 101 determines whether each of the side rails 21 to 51 is located at the second position (ST508). When determining that the side rail is located at the second position (ST508: YES), the controller 101 operates the side rail at the second position to the first position (ST509). When operating the side rail to the first position, the controller 101 locks the lock mechanism of the side rail operated to the first position (ST510). The processing in steps ST507 to ST510 is the same as the processing in steps ST103 to ST106 described above.

When locking the lock mechanism of the side rail (ST510) or when determining that none of the side rails 21 to 51 is located at the second position, that is, all of the side rails 21 to 51 are located at the first position (ST508: NO), the controller 101 acquires a state of the bed main body 10 (ST511) and determines whether the bed main body 10 is in a flat state (ST512). When determining that the bed main body 10 is not in the flat state (ST512: NO), the controller 101 operates the bed main body 10 to the flat state (ST513). Specifically, the controller 101 minimizes lengths of the back ACT 105 and the upper leg ACT 107, and brings the back section 11, the seat section 12, the upper leg section 13, and the lower leg section 14 into a substantially flat state.

When operating the bed main body 10 to the flat state (ST513) or when determining that the bed main body 10 is in the flat state (ST512: YES), the controller 101 acquires information indicating the height (ST514). The information indicating the height is included in, for example, the image analysis result information. Next, the controller 101 acquires a current floor height of the bed main body 10 (ST515), and determines whether the current floor height is an appropriate floor height (ST516). Here, the appropriate floor height is a height at which the bed system 1*a* can be easily conveyed when the nurse conveys the bed system 1*a*. The appropriate floor height varies depending on the height of the nurse. Therefore, for example, first correspondence relationship information may be defined in advance and stored in the memory 103. In the first correspondence relationship information, the information indicating the height described above is associated with the appropriate floor height. The controller 101 acquires the appropriate floor height from the first correspondence relationship information stored in the memory 103 and the information indicating the height included in the image analysis result information. When determining that the bed main body 10 is not at the appropriate floor height (ST516: NO), the controller 101 operates the height of the bed main body 10 to the appropriate floor height (ST517).

When the height of the bed main body 10 reaches the appropriate floor height (ST517) or when the controller 101 determines that the bed main body 10 is at the appropriate floor height (ST516: YES), the process ends.

By executing the process, the bed system 1*a* can automatically operate the side rails 21, 31, 41, and 51 located at the second position to the first position when the nurse conveys the bed main body 10. Therefore, it is possible to prevent a situation in which the user tumbles down the bed main body 10 during conveyance. Since the bed system 1*a* can automatically adjust the floor height of the bed main body 10 according to the height of the nurse, the nurse can convey the bed system 1*a* in a comfortable posture.

Figure 13:
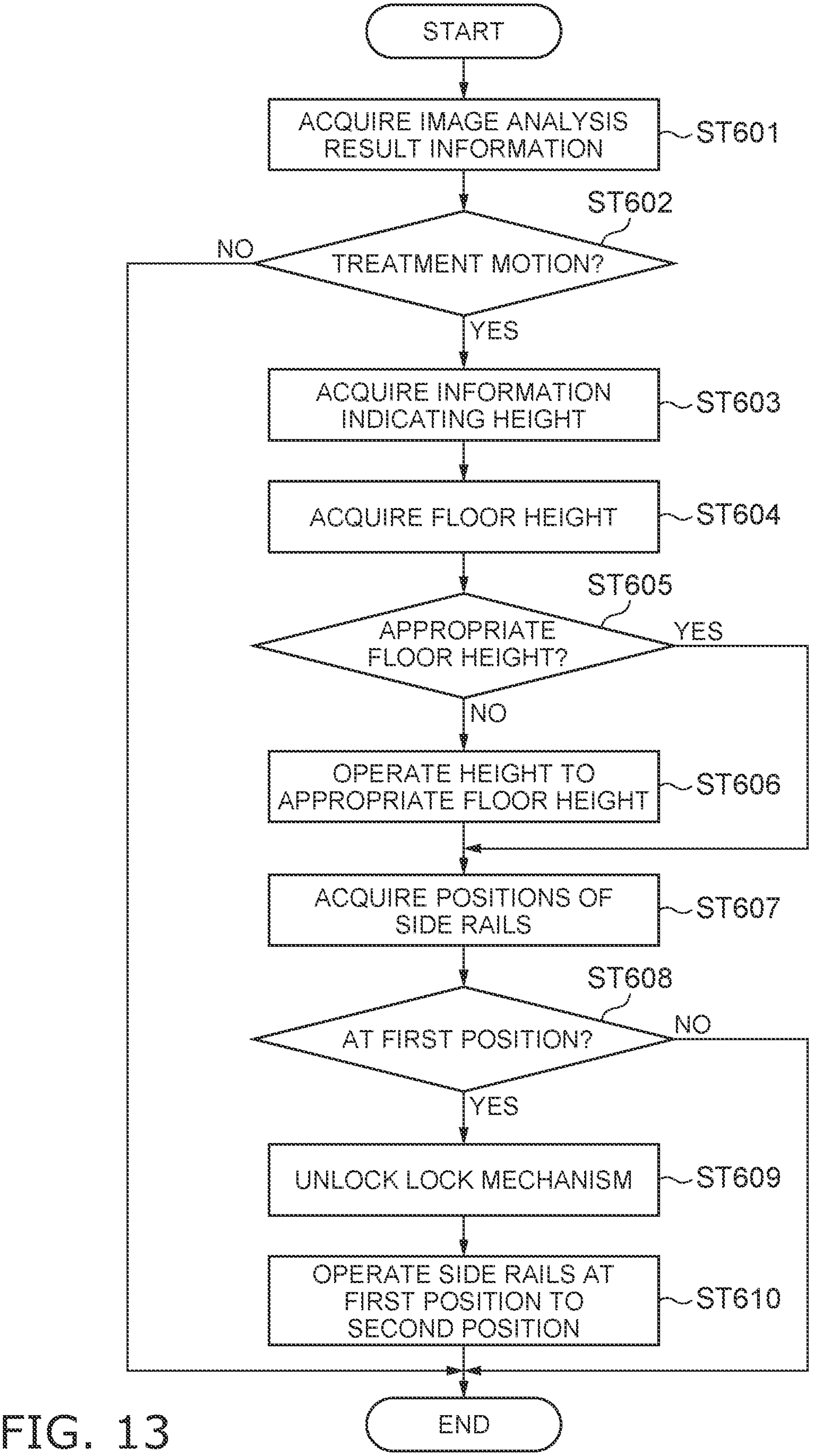
FIG. 13 is a flowchart illustrating an example of a process corresponding to a treatment.

FIG. 13 is a flowchart illustrating an example of a process corresponding to a treatment when the nurse performs a treatment on the user of the bed main body 10.

As illustrated in FIG. 13, the controller 101 acquires image analysis result information (ST601). The controller 101 acquires the image analysis result information from the AI camera 61 via the communicator 102. Here, the image analysis result information includes information indicating whether the nurse is present, and information about whether a motion of performing a treatment on the user of the bed main body 10 is indicated when the nurse is present.

Next, the controller 101 determines whether the motion of the nurse is a treatment motion based on the image analysis result information (ST602). When the controller 101 determines that the nurse does not perform the treatment motion (ST602: NO), the process ends.

When determining that the motion of the nurse is the treatment motion (ST602: YES), the controller 101 acquires the information indicating the height of the nurse (ST603). The information indicating the height is included in, for example, the image analysis result information. Next, the controller 101 acquires a current floor height of the bed main body 10 (ST604), and determines whether the current floor height is an appropriate floor height (ST605). Here, the appropriate floor height is a height at which the nurse can easily perform the treatment when performing the treatment on the user. The appropriate floor height varies depending on the height of the nurse. Therefore, for example, second correspondence relationship information may be defined in advance and stored in the memory 103. In the second correspondence relationship information, the information indicating the height described above is associated with the appropriate floor height. The controller 101 acquires the appropriate floor height from the second correspondence relationship information stored in the memory 103 and the information indicating the height included in the image analysis result information. When determining that the bed main body 10 is not at the appropriate floor height (ST605: NO), the controller 101 operates the height of the bed main body 10 to the appropriate floor height (ST606).

When the height of the bed main body 10 reaches the appropriate floor height (ST606) or when the controller 101 determines that the bed main body 10 is at the appropriate floor height (ST605: YES), the controller 101 acquires positions of the side rails 21 to 51 (ST607). Next, the controller 101 determines whether each of the side rails 21 to 51 is located at the first position (ST608). When determining that the side rail is located at the first position (ST608: YES), the controller 101 unlocks the lock mechanism of the side rail located at the first position (ST609), and operates the side rail at the first position in which the lock mechanism is unlocked to the second position (ST610). The processing in steps ST607 to ST610 is the same as the processing in steps ST203 to ST206 described above.

By executing the process, when the nurse performs certain treatment on the user, the bed system 1*a* can automatically operate the side rails 21, 31, 41, and 51 located at the first position to the second position at a timing when the bed system 1*a* can recognize that the motion is a treatment motion. Therefore, when the nurse performs the treatment on the user, the side rails 21 to 51 do not interfere with the treatment. The bed system 1*a* can change the height of the bed main body 10 in accordance with the height of the nurse who performs the treatment at the timing when the bed system 1*a* can recognize that the motion is the treatment motion. In this manner, since the height of the bed main body 10 is changed in advance, the nurse can smoothly perform the treatment on the user.

In the above embodiments, configurations are described in which the AI camera 61 is attached to the foot board 16 of the bed main body 10, or the AI cameras 62 and 61 are attached to the head board 15 and the foot board 16, respectively, but the embodiments are not limited thereto. For example, an AI camera may be attached to a ceiling above the bed main body 10, and a user or a user and a doctor or a nurse may be imaged from an upper side in a downward direction. For example, the AI camera may be attached to an upper portion of a wall surface in the vicinity of the bed main body 10, and the user or the user and the doctor or the nurse may be imaged in an obliquely downward direction. In this manner, by providing the AI camera, a bed system can detect and predict a motion of the user and a motion of the doctor or the nurse using one AI camera.

Further, in the above embodiments, cases are described in which the bed systems 1 and 1*a* detect the motions of the user, the doctor or the nurse by the AI cameras 61 and 62, but the embodiments are not limited thereto. For example, a detector that detects the motion of the user may be provided on the bed main body 10, and the bed systems 1 and 1*a* may control motions of the side rails 21 to 51 based on a detection result of the detector. Such a detector may use, for example, a sensor that detects a bed-departure motion of the user, which is called a bed-departure catch.

Further, in the second embodiment, a case is described in which an image captured by the AI camera 62 is analyzed by the AI camera 61 together with an image captured by the AI camera 61, but the embodiment is not limited thereto. The AI camera 61 and the AI camera 62 may separately perform image analysis processing. In this case, the AI camera 61 may perform image analysis on the image of the motion of the user, and the AI camera 62 may perform image analysis on the image of the motion of the doctor or the nurse. In the bed system 1, the AI camera 61 may be provided on the head board 15, and may perform image analysis on the image of the motion of the doctor or the nurse.

Further, the wheel sensors 151 to 154 according to the second embodiment may be provided in the bed system 1 according to the first embodiment, and in the process illustrated in FIG. 6, the process illustrated in FIG. 7, and the process illustrated in FIG. 8 described above, the controller 101 may determine whether each wheel is in the unlocked state based on the information transmitted from the wheel sensors, and the process may proceed when the wheels are in the locked state. The determination processing may be executed, for example, after the processing (ST202) of determining whether the motion is the bed-departure motion in FIG. 6, after the processing (ST302) of determining whether the user is sleeping in FIG. 7, and after the processing (ST402) of determining whether the motion is the sit-up motion in FIG. 8. In this manner, the bed system 1 is configured such that the process does not proceed unless the wheels are in the locked state, and thus safety can be secured.

The embodiments according to the disclosure are described above with reference to specific examples. However, the disclosure is not limited to these specific examples. For example, those skilled in the art may similarly practice the disclosure by appropriately selecting specific configurations of components such as a sensor, a processor, a control circuit, an actuator, and an AI camera that are provided in a bed system from known art, and such practice falls within the scope of the disclosure to the extent that similar effects can be attained.

A combination of any two or more components of the specific examples within a technically feasible range also falls within the scope of the disclosure to the extent that the combination includes the spirit of the disclosure.

In addition, all of the bed systems that those skilled in the art can achieved by making an appropriate design change based on the bed systems described above as the embodiments of the disclosure also fall within the scope of the disclosure to the extent that the modifications include the spirit of the disclosure.

In addition, in the category of ideas of the disclosure, various modifications and corrections can be conceived by those skilled in the art, and these modifications and corrections are also understood to be embraced within the scope of the disclosure.

The embodiments include the following aspects.

APPENDIX 1

A bed system including:

a bed main body;

a side rail provided on the bed main body;

a driving unit configured to drive the side rail;

a first detector configured to detect a motion of a user on the bed main body; and a controller configured to control the driving unit based on the motion of the user detected by the first detector.

APPENDIX 2

The bed system according to Appendix 1, in which the driving unit operates the side rail between a first position and a second position.

APPENDIX 3

The bed system according to Appendix 2, in which the first position is a position at which the side rail prevents the user from falling off the bed main body, and the second position is a position at which the side rail does not interfere with up and down motions of the user with respect to the bed main body.

APPENDIX 4

The bed system according to Appendix 2 or 3, further including:

a lock mechanism configured to lock the side rail at the first position, in which when operating the side rail from the first position to the second position, the controller operates the side rail after unlocking the lock mechanism, and when operating the side rail from the second position to the first position, the controller locks the lock mechanism after operating the side rail.

APPENDIX 5

The bed system according to any one of Appendixes 1 to 4, in which the first detector includes a motion pattern memory configured to store a motion pattern of the user, and a prediction unit configured to predict a motion of the user based on the motion pattern of the user stored in the motion pattern memory, and the controller controls the driving unit based on the motion of the user predicted by the prediction unit.

APPENDIX 6

The bed system according to any one of Appendixes 1 to 5, in which the bed main body includes a head board provided on a head side of the user, and a foot board provided on a foot side of the user, and the first detector is provided on the foot board.

APPENDIX 7

A bed system including:

a bed main body;

a side rail provided on the bed main body;

a driving unit configured to drive the side rail;

a second detector configured to detect a motion of a caregiver outside the bed main body; and a controller configured to control the driving unit based on the motion of the caregiver detected by the second detector.

APPENDIX 8

A bed system including:

a bed main body;

a side rail provided on the bed main body;

a driving unit configured to drive the side rail;

a first detector configured to detect a motion of a user on the bed main body;

a second detector configured to detect a motion of a caregiver outside the bed main body; and a controller configured to control the driving unit based on the motion of the user detected by the first detector and the motion of the caregiver detected by the second detector.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A bed system comprising:

a bed main body including a frame, a back section provided on the frame and configured to support a user's back and abdomen, and an upper leg section provided on the frame and configured to support the user's knee;

a side rail provided on the bed main body;

a plurality of actuators configured to drive the side rail, the frame, the back section, and the upper leg section, respectively;

a first detector configured to detect a motion of the user on the bed main body; and a controller configured to store, as the user's motion pattern, motions of the user that have been detected in a motion pattern memory, predict a physical state or motion of the user based on comparison of the user's motion pattern stored in the motion pattern memory and the motion detected by the first detector, and control the plurality of actuators based on the predicted physical state or motion of the user.

2. The bed system according to claim 1, wherein the plurality of actuators includes a first actuator configured to move the side rail between a first position and a second position.

3. The bed system according to claim 2, wherein the first position is a position at which the side rail prevents the user from falling off the bed main body, and the second position is a position at which the side rail does not interfere with up and down motions of the user with respect to the bed main body.

4. The bed system according to claim 2, further comprising:

a lock mechanism configured to lock the side rail at the first position, wherein when the side rail is moved from the first position to the second position, the controller controls the first actuator to move the side rail after operating to unlock the lock mechanism, and when the side rail is moved from the second position to the first position, the controller locks operates to unlock the lock mechanism after controlling the first actuator to move the side rail.

5. The bed system according to claim 1, wherein the bed main body includes a head board provided on a head side of the user, and a foot board provided on a foot side of the user, and the first detector is provided on the foot board.

6. The bed system according to claim 1, wherein the controller is configured to detect an on-bed state as the predicted physical state of the user, and upon detecting the on-bed state, control a corresponding one of the actuators to lift the side rail.

7. The bed system according to claim 1, wherein the controller is configured to detect a bed-departing motion as the predicted motion of the user, and upon detecting the bed-departing motion, control a corresponding one of the actuators to lower the side rail.

8. The bed system according to claim 1, wherein the controller is configured to detect a sleeping state as the predicted physical state of the user, and upon detecting the sleeping state, control a first corresponding one of the actuators to lift the side rail and a second corresponding one of the actuators to lower the frame.

9. The bed system according to claim 1, wherein the controller is configured to detect a sitting-up motion as the predicted motion of the user, and upon detecting the sitting-up motion, control a first corresponding one of the actuators to lower the side rail, a second corresponding one of the actuators to lower the frame, and a third corresponding one of the actuators to lift the back section.

10. A bed system comprising:

a bed main body including a frame, a back section provided on the frame and configured to support a user's back and abdomen, and an upper leg section provided on the frame and configured to support the user's knee;

a side rail provided on the bed main body;

a plurality of actuators configured to drive the side rail, the frame, the back section, and the upper leg section, respectively;

a second detector configured to detect a motion of a caregiver outside the bed main body; and a controller configured to store, as a caregiver's motion pattern, motions of caregivers that have been detected in a motion pattern memory, predict a motion of the caregiver based on comparison of the caregiver's motion pattern stored in the motion pattern memory and the motion detected by the second detector, and control the plurality of actuators based on the predicted motion of the caregiver.

11. The bed system according to claim 10, wherein the controller is configured to detect a bed-conveying motion as the predicted motion of the caregiver, and upon detecting the bed-conveying motion, control a first corresponding one of the actuators to lift the side rail.

12. The bed system according to claim 11, wherein the first detector includes a camera, and the controller is further configured to detect a height of the caregiver based on an image captured by the camera, and upon detecting the bed-conveying motion, control a second corresponding one of the actuators to move the frame to a height corresponding to the detected height of the caregiver.

13. The bed system according to claim 10, wherein the controller is configured to detect a treatment motion as the predicted motion of the caregiver, and upon detecting the treatment motion, control a first corresponding one of the actuators to lower the side rail.

14. The bed system according to claim 13, wherein the first detector includes a camera, and the controller is further configured to detect a height of the caregiver based on an image captured by the camera, and upon detecting the treatment motion, control a second corresponding one of the actuators to move the frame to a height corresponding to the detected height of the caregiver.

15. A bed system comprising:

a bed main body including a frame, a back section provided on the frame and configured to support a user's back and abdomen, and an upper leg section provided on the frame and configured to support the user's knee;

a side rail provided on the bed main body;

a plurality of actuators configured to drive the side rail, the frame, the back section, and the upper leg section, respectively;

a first detector configured to detect a motion of a user on the bed main body;

a second detector configured to detect a motion of a caregiver outside the bed main body; and a controller configured to store, as the user's motion pattern, motions of the user that have been detected in a motion pattern memory, predict a physical state or motion of the user based on comparison of the user's motion pattern stored in the motion pattern memory and the motion detected by the first detector, store, as a caregiver's motion pattern, motions of caregivers that have been detected in the motion pattern memory, predict a motion of the caregiver based on comparison of the caregiver's motion pattern stored in the motion pattern memory and the motion detected by the second detector, and control the plurality of actuators based on the predicted physical state or motion of the user and the predicted motion of the caregiver.

* * * * *